United States Patent
Sorensen et al.

(10) Patent No.: US 9,624,921 B2
(45) Date of Patent: Apr. 18, 2017

(54) PUMP ROLLER HEAD WITH PIVOTING ROLLERS AND SPRING ARMS

(71) Applicant: Alcon Research, Ltd., Fort Worth, TX (US)

(72) Inventors: Gary P. Sorensen, Laguna Niguel, CA (US); Gregory S. Layser, Oceanside, CA (US); Mel Matthew Oliveira, Huntington Beach, CA (US); Behzad Hashemi, Irvine, CA (US)

(73) Assignee: Novartis AG, Basel (CH)

( * ) Notice: Subject to any disclaimer, the term of this patent is extended or adjusted under 35 U.S.C. 154(b) by 196 days.

(21) Appl. No.: 13/905,231

(22) Filed: May 30, 2013

(65) Prior Publication Data
US 2014/0356202 A1    Dec. 4, 2014

(51) Int. Cl.
*F04B 43/00* (2006.01)
*F04B 43/12* (2006.01)
*F16C 19/30* (2006.01)
*F16C 33/58* (2006.01)

(52) U.S. Cl.
CPC .......... *F04B 43/1269* (2013.01); *F04B 43/12* (2013.01); *F04B 43/1253* (2013.01); *F16C 19/30* (2013.01); *F16C 33/58* (2013.01); *Y10T 16/364* (2015.01); *Y10T 16/381* (2015.01); *Y10T 16/384* (2015.01); *Y10T 16/3837* (2015.01)

(58) Field of Classification Search
CPC .. F04B 43/12; F04B 43/1253; F04B 43/1269; Y10T 16/364; Y10T 16/381; Y10T 16/3837; Y10T 16/384; F16C 19/30; F16C 33/58

USPC ............ 417/477.7, 477.5, 477.3, 477.1
See application file for complete search history.

(56) References Cited

U.S. PATENT DOCUMENTS

| | | | | |
|---|---|---|---|---|
| 612,834 A | * | 10/1898 | Dieckmann | 417/477.5 |
| 1,659,238 A | * | 2/1928 | Boyce | F04B 1/124 |
| | | | | 123/56.4 |
| 2,671,412 A | * | 3/1954 | Rand | F04B 43/14 |
| | | | | 417/476 |
| 2,722,893 A | * | 11/1955 | Maillot | F04B 43/021 |
| | | | | 417/474 |
| 3,137,242 A | * | 6/1964 | Hahn | A61M 5/142 |
| | | | | 417/412 |

(Continued)

FOREIGN PATENT DOCUMENTS

| | | | | |
|---|---|---|---|---|
| EP | 0239255 A1 | 9/1987 | | |
| EP | 0320963 A2 | * 6/1989 | .......... F04B 43/1269 |

(Continued)

OTHER PUBLICATIONS

Machine Translation of EP 0320963.*

(Continued)

*Primary Examiner* — Charles Freay
*Assistant Examiner* — Christopher Bobish
(74) *Attorney, Agent, or Firm* — Kenneth D. Bassinger

(57) ABSTRACT

A roller assembly comprises a central section with a hub; a plurality of flexible arms coupled to the central section; a plurality of spring pins, one spring pin coupled to each of the plurality of flexible arms; a plurality of arms coupled to the central section such that each arm is capable of pivoting independently with respect to the central section; and a plurality of rollers, one roller coupled to each of the plurality of arms.

16 Claims, 16 Drawing Sheets

(56) References Cited

U.S. PATENT DOCUMENTS

| | | | | |
|---|---|---|---|---|
| 3,192,863 | A | | 7/1965 | Vadot |
| 3,403,668 | A | * | 10/1968 | Schottler ............... F01B 3/0005 |
| | | | | 123/197.2 |
| 3,644,068 | A | * | 2/1972 | Lepak ......................... 417/477.7 |
| 3,822,948 | A | * | 7/1974 | Handl ........................... 401/146 |
| 3,927,955 | A | * | 12/1975 | Spinosa et al. ............ 417/477.3 |
| 3,960,466 | A | * | 6/1976 | Taylor ............................ 417/234 |
| 3,963,023 | A | | 6/1976 | Hankinson |
| 4,174,193 | A | | 11/1979 | Sakakibara |
| 4,363,609 | A | * | 12/1982 | Cosentino et al. ........ 417/477.5 |
| 4,392,794 | A | * | 7/1983 | Foxcroft ................. F04B 43/14 |
| | | | | 417/475 |
| 4,441,867 | A | * | 4/1984 | Berelson ....................... 417/475 |
| 4,484,864 | A | | 11/1984 | Michel |
| 4,564,342 | A | * | 1/1986 | Weber et al. ............. 417/477.6 |
| 5,215,443 | A | | 6/1993 | Hani et al. |
| 5,533,878 | A | * | 7/1996 | Iwata ................. F04B 43/1269 |
| | | | | 417/477.3 |
| 5,759,017 | A | * | 6/1998 | Patton et al. ............. 417/477.9 |
| 6,168,397 | B1 | * | 1/2001 | Iwata ................. F04B 43/0072 |
| | | | | 417/477.12 |
| 6,186,014 | B1 | * | 2/2001 | Kato .................... B23Q 3/1554 |
| | | | | 74/53 |
| 6,296,460 | B1 | | 10/2001 | Smith |
| 6,645,176 | B1 | * | 11/2003 | Christenson et al. ........ 604/151 |
| 6,743,204 | B2 | | 6/2004 | Christenson et al. |
| 6,860,167 | B2 | * | 3/2005 | Schmidt ............... B60G 17/025 |
| | | | | 74/55 |
| 2006/0245964 | A1 | | 11/2006 | Koslov |
| 2008/0131300 | A1 | * | 6/2008 | Junod ................. F04B 43/1269 |
| | | | | 417/476 |
| 2009/0269228 | A1 | | 10/2009 | Mcintosh |
| 2010/0047100 | A1 | | 2/2010 | Kojima et al. |
| 2010/0286651 | A1 | | 11/2010 | Sorensen |
| 2010/0316516 | A1 | * | 12/2010 | Vidal ................. F04B 43/1215 |
| | | | | 417/477.3 |
| 2012/0020822 | A1 | * | 1/2012 | Richardson et al. ...... 417/477.2 |
| 2014/0356203 | A1 | * | 12/2014 | Baxter ....................... 417/477.1 |

FOREIGN PATENT DOCUMENTS

| | | | | |
|---|---|---|---|---|
| GB | 2051253 | A | * 1/1981 | .............. F04B 43/12 |
| GB | 2412698 | A | 10/2005 | |

OTHER PUBLICATIONS

PCT/US2014/023104, "International Search Report", International Searching Authority, Jul. 1, 2014, 2 pgs.
PCT/US2014/023104, "Written Opinion", International Searching Authority, Jul. 1, 2014, 4 pgs.
International Searching Authority, International Preliminary Report on Patentability, PCT/US2014/023104, Mailed Dec. 1, 2015, 5 pages.
European Patent Office, Extended European Search Report, EP Application No. 14804183.3, EP Patent No. 2932099, dated Aug. 5, 2016, 8 pages.

* cited by examiner

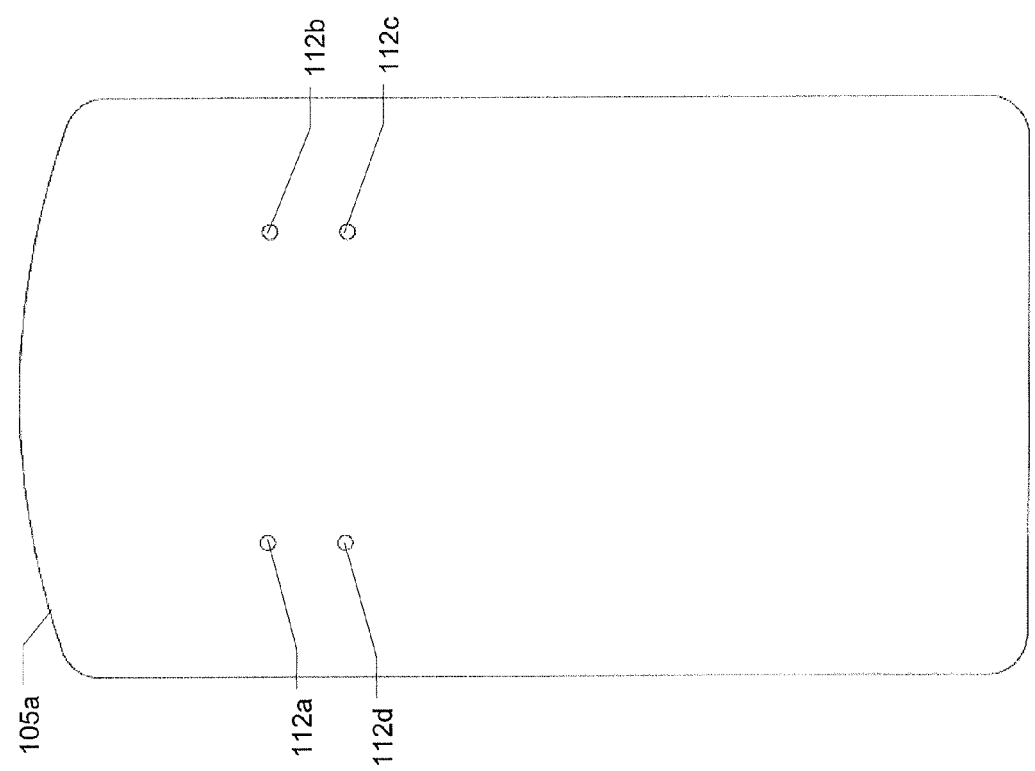
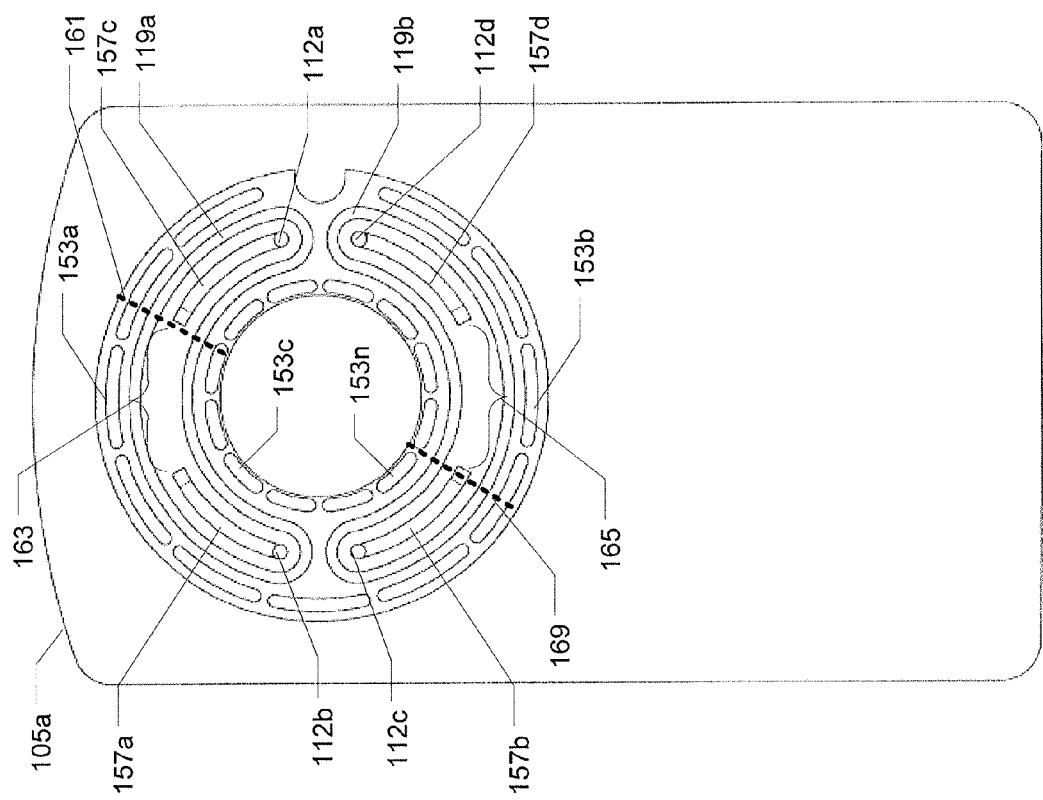
FIG. 1c
FIG. 1d

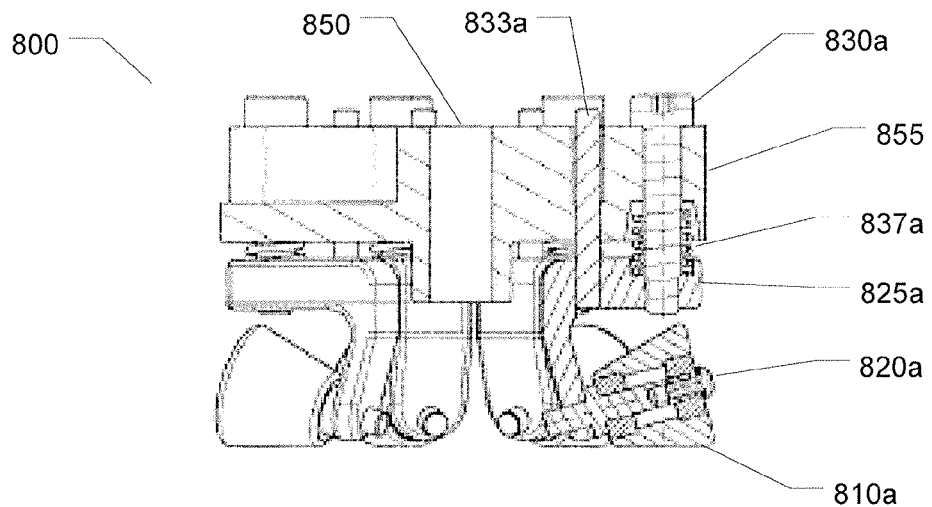
*FIG. 8c*
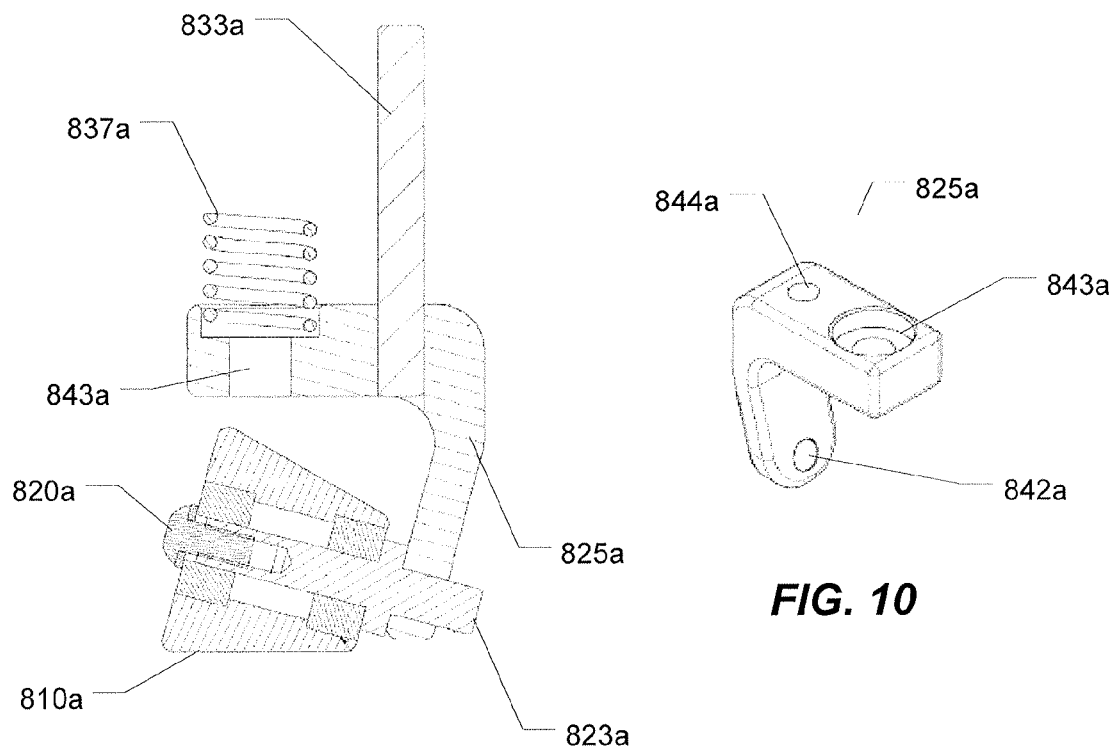
*FIG. 9*
*FIG. 10*

PUMP ROLLER HEAD WITH PIVOTING ROLLERS AND SPRING ARMS

BACKGROUND OF THE INVENTION

The present invention generally pertains to pumps. More particularly, but not by way of limitation, the present invention pertains to peristaltic pumps.

Peristaltic pumps may be used in many different applications including delivery of fluid during surgical applications (e.g., ophthalmic surgical applications). Peristaltic pumps may operate by compressing a length of tubing to move a fluid in the tubing or squeeze a molded flow channel between an elastomeric sheet and a rigid substrate to move a fluid between the elastomeric sheet and the rigid substrate. Rotating roller heads applied against the tubing or elastomeric sheet may be used for compressing the tubing or elastomeric sheet. While peristaltic pumps may provide predictable flow properties, they may also impart unwanted flow and pressure pulsations. In addition, the rotating roller heads may fail to properly compress the tubing or elastomeric sheet. It would be desirable to have a peristaltic pump roller assembly that overcomes these problems.

SUMMARY OF THE INVENTION

In one embodiment of the present invention, a roller assembly comprises a central section with a hub; a plurality of arms coupled to the central section, each arm having a radial section, an arcuate section, and a bent section; and a plurality of rollers, one roller coupled to the bent section of each arm. The arms may be flexible such that the rollers are capable of moving with respect to the central section when the arms flex. The roller may be coupled to the bent section with a pin. The arms and the rollers are distributed around the hub. A rolling surface of the rollers is generally parallel with a flat surface of the central section. The rolling surface of the rollers is arranged to engage a polymer sheet or flexible tubing throughout travel of the arms. The central section and arms may be cut from a single sheet of material. In addition, the central section may comprise a first flat surface, the radial section of the arm may comprise a second flat surface, and the axial section of the arm may comprise a fourth flat surface in which the first flat surface generally parallel to the second and third flat surfaces. Further, the bent section may comprise a fourth flat surface, the fourth flat surface arranged at an angle of between 900 and 140 degrees with respect to the first, second and third flat surfaces. The roller may be coupled to the bent section via a pin and cap pin In another embodiment of the present invention, a roller assembly for use with a peristaltic pump system comprises a central section with a hub; a plurality of arms coupled to the central section, each arm having a radial section, an arcuate section, and a bent section; a plurality of rollers, one roller coupled to the bent section of each arm; wherein the central section comprises a first flat surface, the radial section of the arm comprises a second flat surface, and the axial section of the arm comprises a fourth flat surface, the first flat surface generally parallel to the second and third flat surfaces, and further wherein the bent section comprises a fourth flat surface, the fourth flat surface arranged at an angle with respect to the first, second and third flat surfaces.

In another embodiment of the present invention, a roller assembly comprises a central section with a hub; a plurality of flexible arms coupled to the central section; a plurality of spring pins, one spring pin coupled to each of the plurality of flexible arms; a plurality of arms coupled to the central section such that each arm is capable of pivoting independently with respect to the central section; and a plurality of rollers, one roller coupled to each of the plurality of arms. The roller may be coupled to the arm with a pin. The arms and the rollers may be distributed around the hub. A rolling surface of the rollers is generally parallel with a flat surface of the central section. The arm has a stop located at an end of the arm, the stop engages the central section to limit a range of pivoting motion of the arm. The arm may be coupled to a pivot, the pivot located adjacent to the stop. Each of the plurality of arms may have a flat that contacts the plurality of spring pins. The spring pin exerts a force on the flat, the force provided by the flexible arm. The spring pin presses on the flat to bias the arm in an unpivoted position whereby the stop contacts the central section. The plurality of flexible arms and a top surface of the central section may be formed from single sheet of material. The rolling surface of the rollers may be arranged to engage a polymer sheet or flexible tubing throughout a range of travel of the arms.

In another embodiment of the present invention, a roller assembly comprises a central section with a hub; a plurality of flexible arms coupled to the central section; a plurality of spring pins, one spring pin coupled to each of the plurality of flexible arms; a plurality of arms coupled to the central section such that each arm is capable of pivoting independently with respect to the central section, each arm having a pivot located adjacent to a stop; and a plurality of rollers, one roller coupled to each of the plurality of arms; wherein each spring pin exerts a force on an associated arm, the force provided by an associated flexible arm so as to bias the arm in a nonpivoted position.

In another embodiment of the present invention, a roller assembly comprises a central section with a hub; a plurality of spring assemblies coupled to the central section; a plurality of arms coupled to the central section such that each arm is capable of pivoting independently with respect to the central section; and a plurality of rollers, one roller coupled to each of the plurality of arms. Each roller may be coupled to each arm with a pin. The arms and the rollers may be distributed around the hub. A rolling surface of the rollers is generally parallel with a flat surface of the central section. Each of the plurality of arms may have a stop located at an end of each arm, each stop engages the central section to limit a range of pivoting motion of each arm. Each of the plurality of arms may be coupled to a pivot, the pivot located adjacent to the stop. Each spring assembly further comprises a spring pin. Each of the plurality of arms may have a flat that contacts the plurality of spring pins. Each spring pin exerts a force on each flat, the force provided by each spring assembly. Each spring pin presses on each flat to bias each arm in an unpivoted position in which each stop contacts the central section. The rolling surface of the rollers is arranged to engage a polymer sheet or flexible tubing throughout a range of travel of the arms.

In another embodiment of the present invention. a roller assembly comprises a central section with a hub; a plurality of spring assemblies coupled to the central section; a plurality of spring pins, one spring pin coupled to each of the plurality of spring assemblies; a plurality of arms coupled to the central section such that each arm is capable of pivoting independently with respect to the central section, each arm having a pivot located adjacent to a stop; and a plurality of rollers, one roller coupled to each of the plurality of arms; wherein each spring pin exerts a force on an associated arm, the force provided by an associated spring assembly so as to bias the arm in a nonpivoted position.

In another embodiment of the present invention, a roller assembly comprises a central section with a hub; a plurality of arms coupled to the central section such that each arm is capable of moving independently with respect to the central section; a plurality of spring pins, one spring pin associated with each arm; a plurality of retaining pins, one retaining pin associated with each arm; and a plurality of rollers, one roller coupled to each arm. The roller may be coupled to the arm via an axle and a pin. The arms and the rollers may be distributed around the hub. A rolling surface of the roller may be generally parallel to a flat surface of the central section. A plurality of springs may be located around the plurality of spring pins, each spring located between each arm and the central section. The spring pin may be located in a first bore in the central section, the retaining pin may be located in a second bore in the central section, the spring pin may be fixed to the arm, and the retaining pin may be fixed to the central section. The roller may be constrained by the retaining pin and the spring pin to move along an axis defined by the retaining pin. The spring exerts a force on each arm thereby biasing each arm away from the central section. One end of the spring may be located in a recess in the central section and the other end of the spring may be located in a recess in the arm. The rolling surface of the rollers may be arranged to engage a polymer sheet or flexible tubing throughout a range of travel of the arms.

In another embodiment of the present invention, a roller assembly comprises a central section with a hub; a plurality of arms coupled to the central section such that each arm is capable of moving independently with respect to the central section; a plurality of spring pins located is a plurality of first bores in the central section, one spring pin fixed to each arm; a plurality of retaining pins located in a plurality of second bores in the central section and fixed to the central section, one retaining pin associated with each arm; and a plurality of rollers, one roller coupled to each arm; wherein the rollers are constrained by the retaining pins and the spring pins to move along an axis defined by the retaining pins.

In another embodiment of the present invention, a roller assembly comprises a central section with a hub, the central section having a plurality of pivots located around the central section; a plurality of arms, each arm having a roller end and a pivot end, the pivot ends coupled to the central section at the plurality of pivots such that each arm is capable of pivoting independently with respect to the central section, the roller ends and pivot ends of each arm located a distance of at least one roller width away from each other; a plurality of rollers, one roller coupled to each of the roller ends of the plurality of arms; wherein the plurality of rollers and arms are located around the central section such that the pivot is located a distance away from the roller. Each roller may be coupled to each arm via an axle and a pin. A rolling surface of the rollers may be generally parallel with a flat surface of the central section. A plurality of springs may be located adjacent to each roller. The plurality of springs may be located in a plurality of spring bores in the central section. Each arm further comprises a pair of pivot pins, the pair of pivot pins coupling the arm to the central section at the pivot. Each arm further comprises a hub retaining surface and a spring coupling surface located near the roller arm end of the arm. The spring coupling surface contacts the spring. The hub retaining surface contacts the hub such that the hub retains the arm adjacent to the central section. When an arm pivots, a roller surface of the roller coupled to the arm is generally parallel to a surface of the central section. The plurality of pivots may be located around a periphery of the central section. The rollers are located interior the periphery of the central section. A rolling surface of the rollers is arranged to engage a polymer sheet or flexible tubing throughout a range of travel of the arms.

In another embodiment of the present invention, a roller assembly comprises a central section with a hub, the central section having a plurality of pivots located around the central section; a plurality of arms, each arm having a roller arm end and a pivot end, the pivot ends coupled to the central section at the plurality of pivots such that each arm is capable of pivoting independently with respect to the central section, the roller arm ends and pivot ends of each arm located a distance of at least one roller width away from each other; a hub retaining surface and a spring coupling surface located near the roller arm end of the arm; a plurality of rollers, one roller coupled to each of the roller ends of the plurality of arms; and a plurality of springs, one spring located adjacent to each roller; wherein the plurality of rollers and arms are located around the central section such that the pivot is located a distance away from the roller, the spring coupling surface contacts the spring, and the hub retaining surface contacts the hub such that the hub retains the arm adjacent to the central section.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1c is a front view of a substrate for two pump segments, according to an embodiment of the present invention.

FIG. 1d is a back view of the substrate for two pump segments, according to an embodiment of the present invention.

FIG. 8c is a side cut away view of the roller assembly of FIG. 8a according to the principles of the present invention.

FIG. 9 is a side cut away view of a single roller head and arm assembly of the roller assembly of FIG. 8a according to the principles of the present invention.

FIG. 10 is a side view of an arm of the roller assembly of FIG. 8a according to the principles of the present invention.

It is to be understood that both the foregoing general description and the following detailed description are exemplary and explanatory only and are intended to provide a further explanation of the present invention as claimed.

DETAILED DESCRIPTION

Reference is now made in detail to the exemplary embodiments of the invention, examples of which are illustrated in the accompanying drawings. Wherever possible, the same reference numbers are used throughout the drawings to refer to the same or like parts.

Figure 1B:
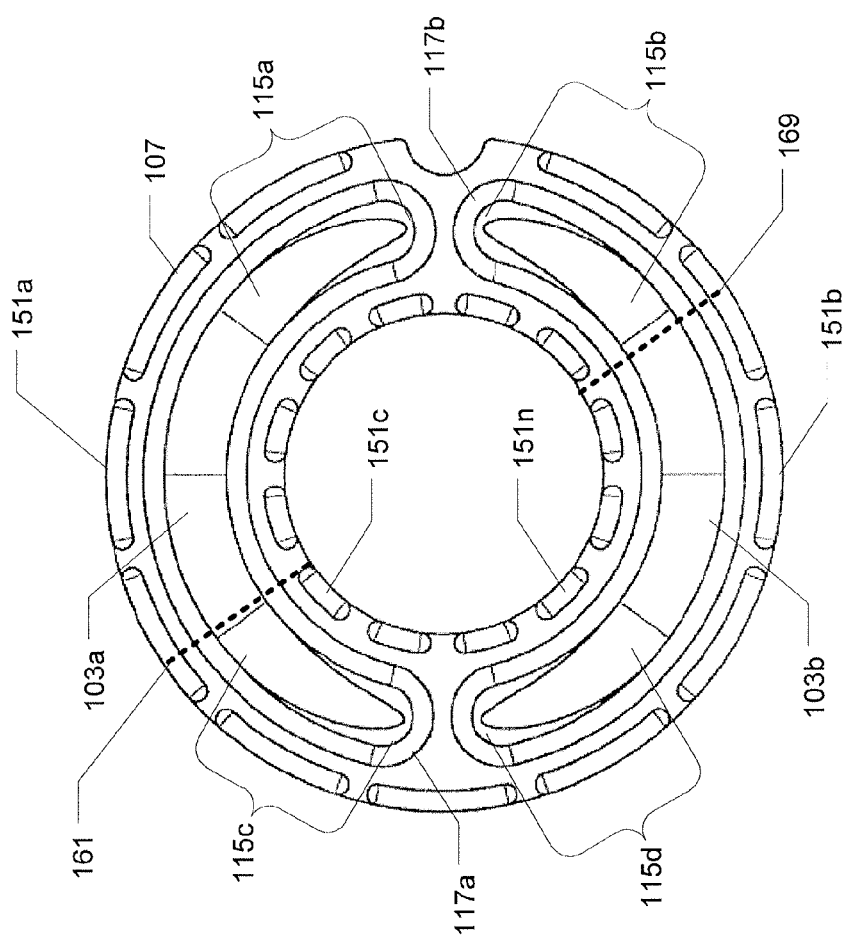
FIG. 1b is a back view of the elastomeric sheet with two pump segments, according to an embodiment of the present invention.
Figure 1A:
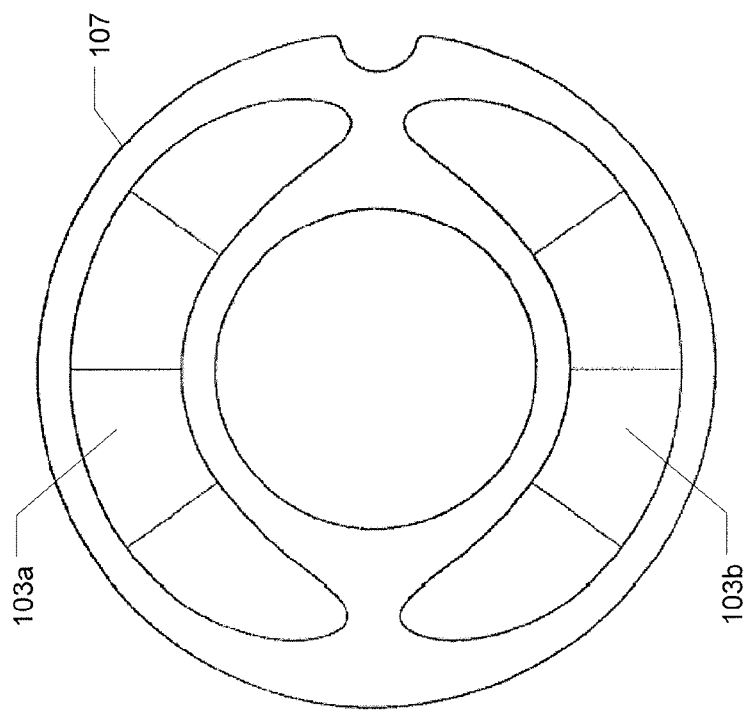
FIG. 1a is a front view of an elastomeric sheet with two pump segments, according to an embodiment of the present invention.
Figure 2A:
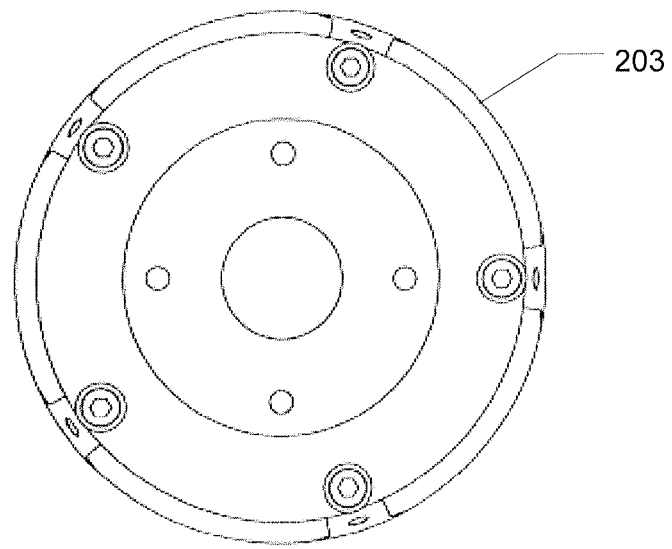
FIG. 2a is a top view of a roller head, according to an embodiment of the present invention.
Figure 2B:
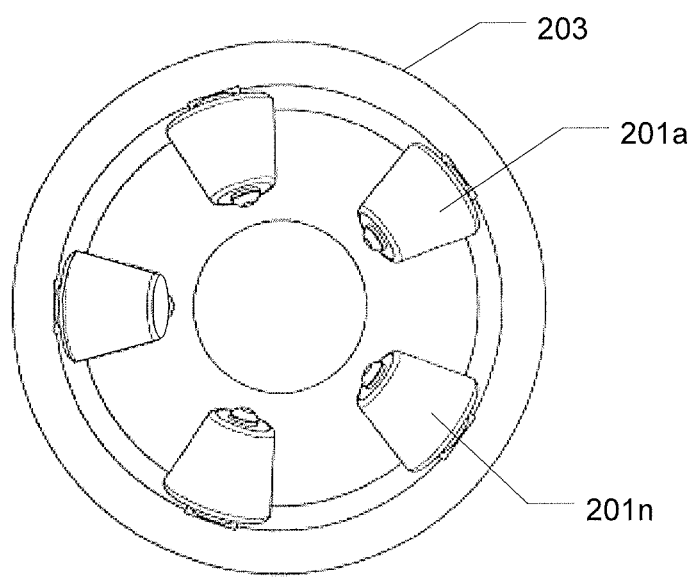
FIG. 2b is a bottom view of the roller head, according to an embodiment of the present invention.

FIGS. 1a-b illustrate a sheet 107 (such as an elastomeric sheet) for coupling to a substrate 105 (e.g., any of substrates 105a-c—generally referred to herein as substrate 105) to define two or more pump segments (e.g., any of pump segments 103a-b—generally referred to herein as pump segments 103) in a cassette 100 (e.g., any of cassettes 100a-b—generally referred to herein as cassette 100). Cassette 100 may use pump segments 103 to provide aspiration and/or infusion of fluid 155 (e.g., see FIG. 5c) for a surgical console (e.g., an ophthalmic surgical console 701 as seen in FIG. 7). FIGS. 1c-d illustrate an embodiment of substrate 105a (other embodiments of the substrate 105 are also contemplated). In various embodiments, the two or more pump segments 103 may be formed between the sheet 107 and the substrate 105 of the cassette 100. Sheet 107 may be made of a flexible, moldable material such as silicone rubber or thermoplastic elastomer. Other materials are also contemplated. Substrate 105 may be made of a material that is rigid with respect to sheet 107, such as a rigid thermoplastic, and may be made by any suitable method, such as machining or injection molding. In some embodiments, the sheet 107 may be bonded or mechanically attached to the substrate 105 (e.g., through adhesive, heat fusion, mechanical crimping, rivets, etc). In some embodiments, protrusions 151a-n on an outer perimeter and/or interior of sheet 107 may engage corresponding recesses 153a-n on substrate 105 to connect the sheet 107 to the substrate 105 and help prevent rotation of the sheet 107 when acted upon by rollers (e.g., see rollers 201a-n in FIG. 2b) (rollers 201a-n—generally referred to herein as rollers 201). As used herein, the label "a-n" is used to refer to the various elements in the presented embodiments for that element. For example, "rollers 201a-n" is used to refer to the rollers shown in, for example, FIG. 2b (FIG. 2b shows 5 rollers—the two rollers in FIG. 2b are labeled 201a and 201n although some of the rollers in each of these FIGS. may not have specific labels). In some embodiments, protrusions 117a,b (which may outline the respective pump segments 103) may fit into corresponding recesses 119a,b (see FIG. 3a). Protrusions 117a,b (and/or 151a-n) may be secured to respective recesses 119a,b (and/or 153a-n) to retain the sheet 107 to the substrate 105. In some embodiments, protrusions 117a,b (and/or 151a-n) may be secured to respective recesses 119a,b (and/or 153a-n) through a mechanical/friction fit, adhesive, heat fusion, etc. In some embodiments, protrusions 117a,b may be secured to respective recesses 119a,b to form a seal to prevent escape of a pump fluid 155 (such as BSS™ (balanced salt solution)) from the pump segments 103.

Figure 3A:
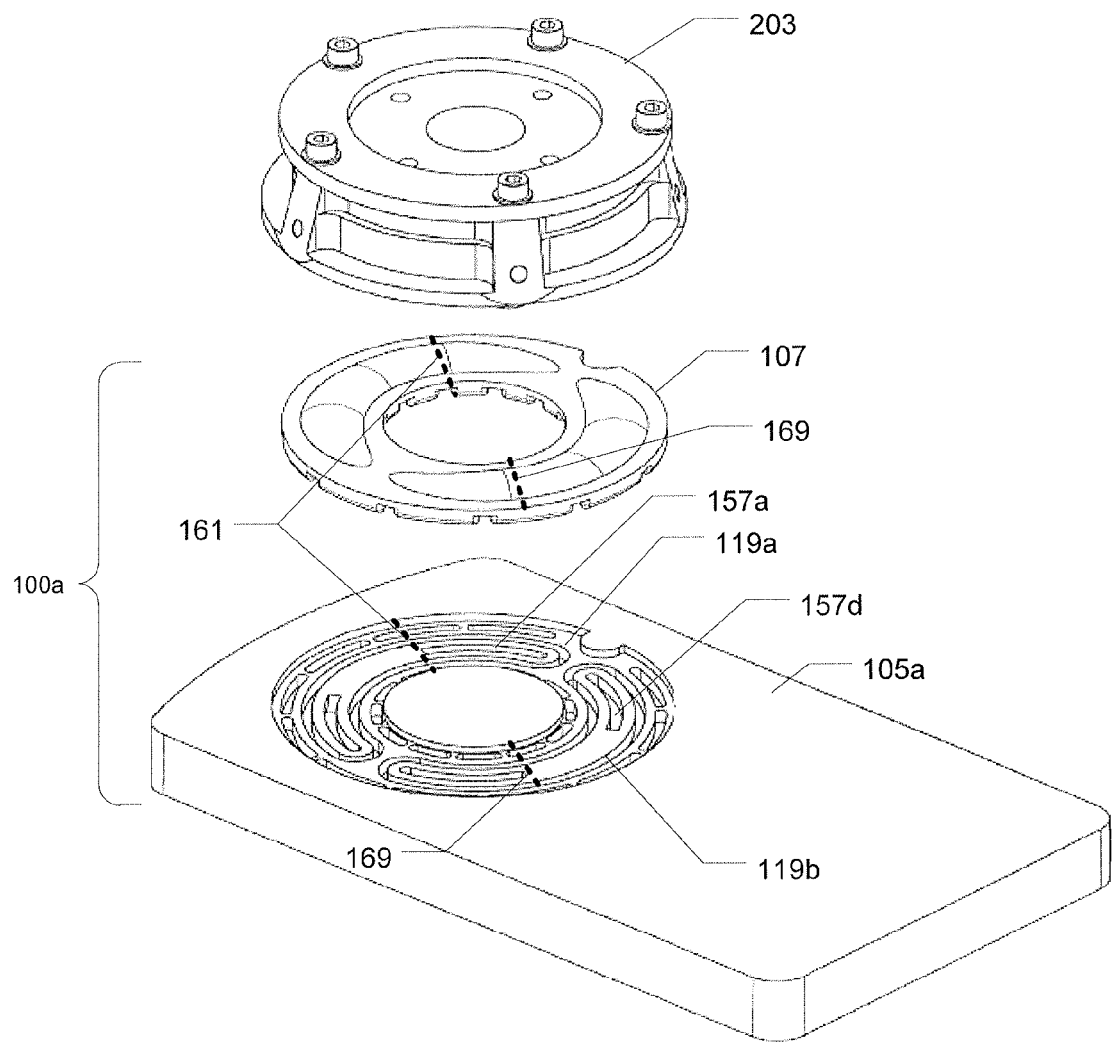
FIGS. 3a and 3b are isometric views of an expanded cassette assembly view, according to an embodiment of the present invention.
Figure 3B:
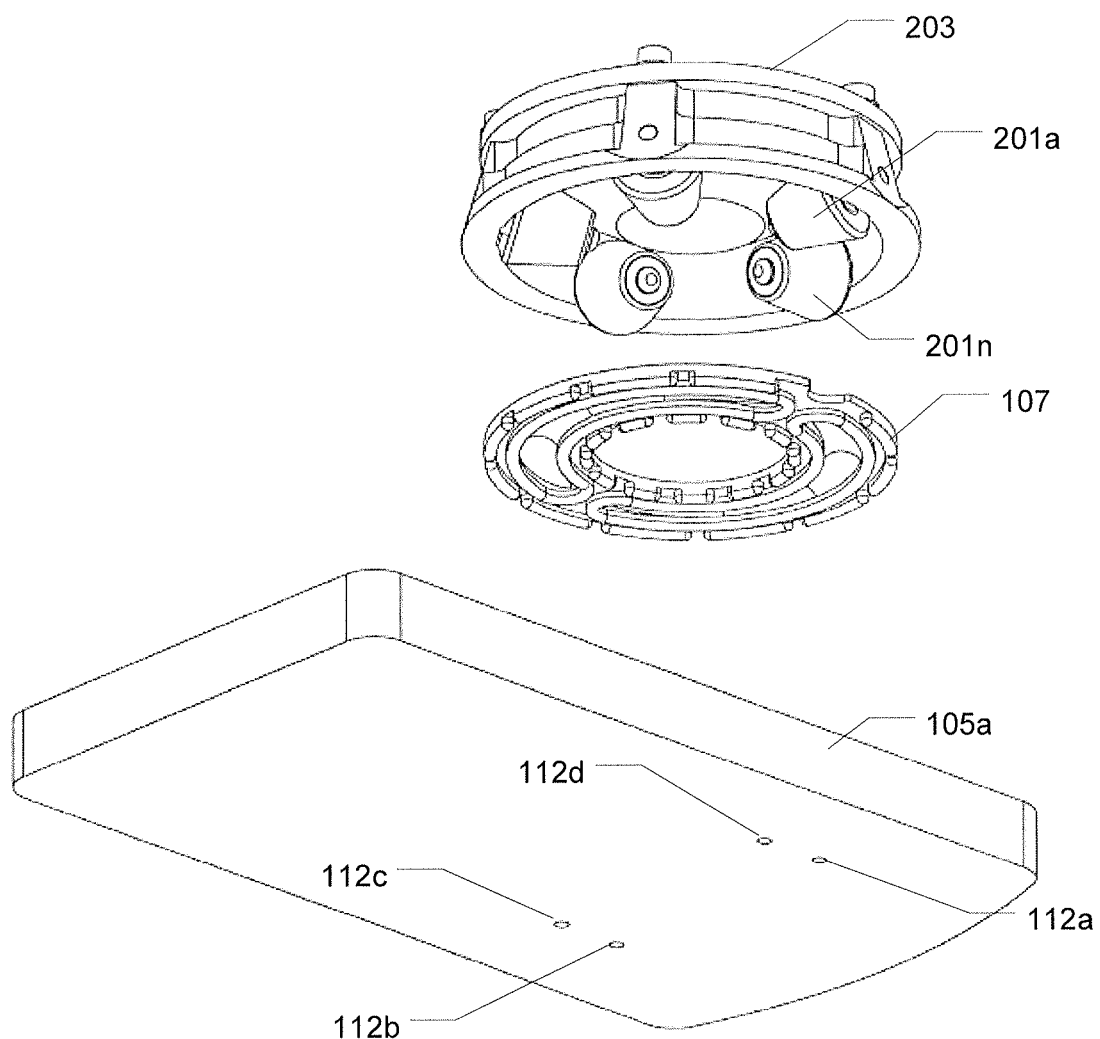
Figure 3C:
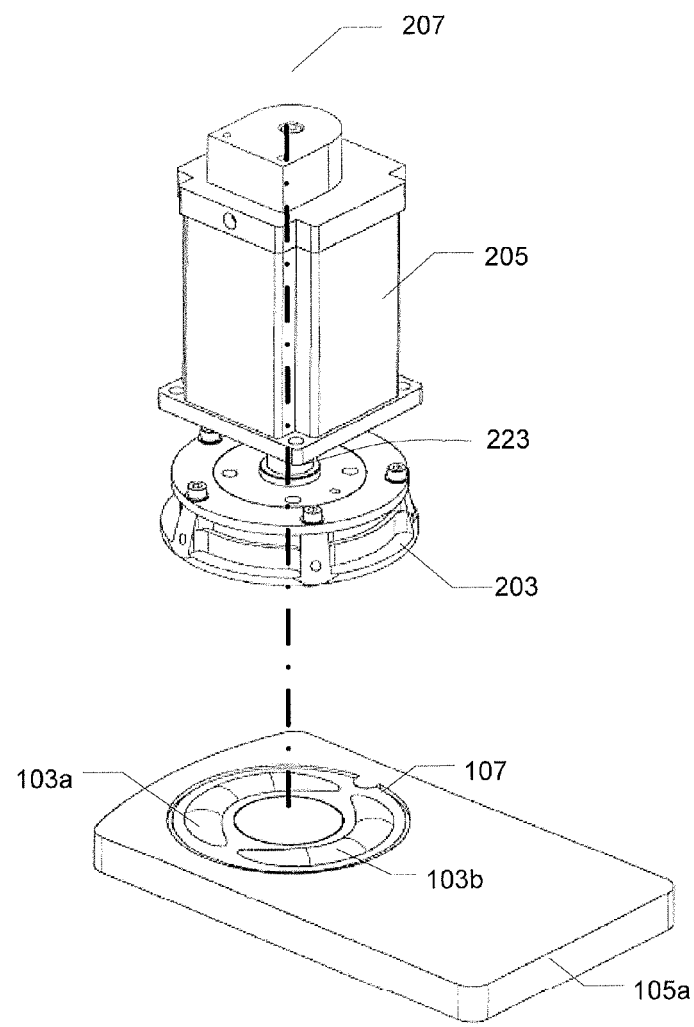
FIG. 3c is a side view of the roller head and motor, according to an embodiment of the present invention.
Figure 3D:
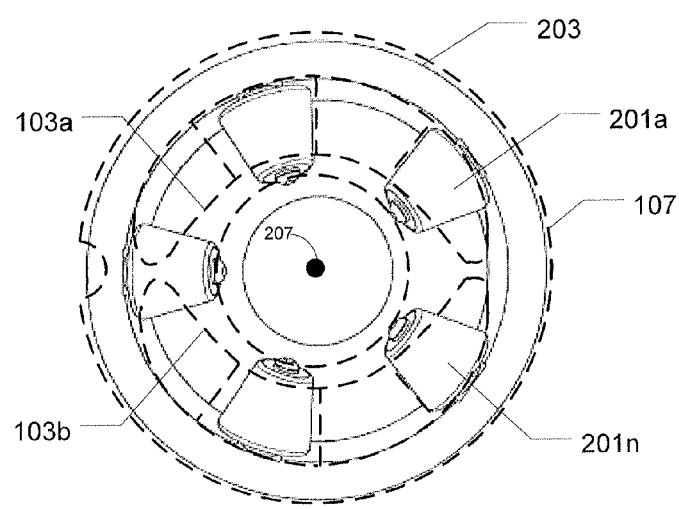
FIG. 3d is an outline of the roller head engaging the sheet, according to an embodiment of the present invention.

In various embodiments, fluid 155 may be pumped through the cassette 100 when a series of rollers 201 engage the two or more pump segments 103 on the cassette 100. FIGS. 2a-b illustrate a roller head 203 with rollers 201. FIGS. 3a-b illustrate isometric views of an embodiment of an expanded cassette assembly view showing the rollers 201, the sheet 107, and the substrate 105. FIG. 3c illustrates an embodiment of the roller head 203 and corresponding peristaltic pump motor 205. In some embodiments, the rollers 201 on the roller head 203 may be radially mounted from an axis of rotation 207 of the peristaltic pump motor 205 (e.g., a stepper or direct current (DC) servo motor, or other motor (such as an alternating current (AC) motor)) and may be configured to compress the pump segments 103 against the underlying substrate 105. The rollers 201 may be mounted to pump motor 205 through roller head 203 and shaft 223 such that pump motor 205 may rotate roller head 203 in a plane generally normal or perpendicular to axis 207 of shaft 223 (see also solid circle 207 in FIG. 3d showing where the axis 207 is perpendicular to the plane of the rollers 201), and the longitudinal axes of rollers 201 may be generally radial to the axis of shaft 223. FIG. 3d illustrates an embodiment of the rollers 201 engaging two pump segments 103a,b on sheet 107 (indicated in dashed lines). The two or more pump segments 103 on the cassette 100 may produce additional flow (e.g., approximately twice the flow for two segments as opposed to one) than if the cassette 100 had only one pump segment engaging the roller head 203.

In various embodiments, the two (or more) active pump segments 103 in the sheet 107 may be acted upon by a single hub roller assembly (e.g., including rollers 201 and roller head 203). As rollers 201 engage the pump segments 103, each roller may first roll over a transition region (e.g., transition regions 115a-d—generally referred to herein as transition region 115) with an underlying transition channel (e.g., transition channels 157a-d—generally referred to herein as transition channel 157). In some embodiments, the sheet 107 may not include transition regions 115 and the substrate 105 may not include transition channels 157. As the rollers 201 roll off of the transition region 115 (and correspondingly, off of the transition channel 157), the rollers 201 may form an internal seal within the pump segment 103 (e.g., at point 161 indicated with dashed lines on pump segment 103a and at point 169 on pump segment 103b) by pressing the sheet 107 fully against substrate 105 at the seal point (in the absence of transition regions and transition channels, the roller 201 may form a seal at the start of the roller's engagement with the sheet 107).

Figure 4A:
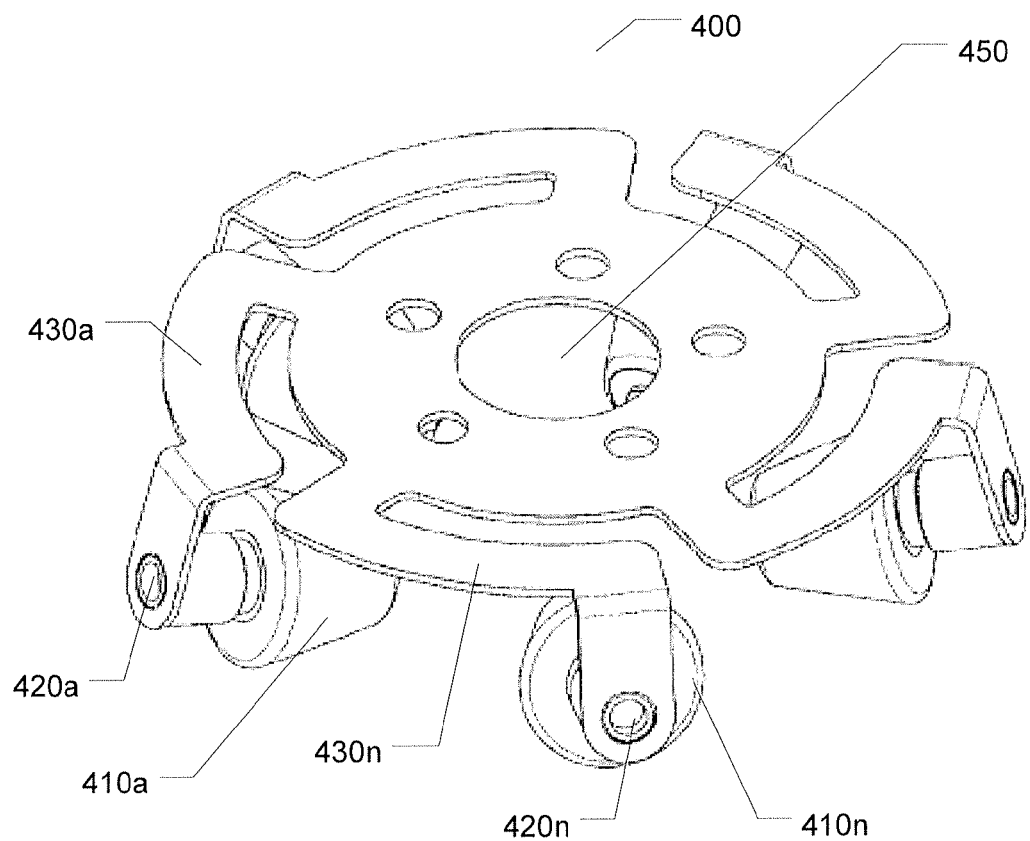
FIG. 4a is an isometric view of a roller assembly according to the principles of the present invention.

FIG. 4a is an isometric view of a roller assembly according to the principles of the present invention. In the roller assembly 400 of FIG. 4a, rollers 410a-n are connected to arms 430a-n via pins 420a-n. Rollers 410a-n are capable of rotating about pins 420a-n. Arms 430a-n are coupled to central section 455. Hub 450 is located in central section 455 and forms a center of rotation. In addition, hub 450 provides an opening for connection of the roller assembly 400 to a motor or other device capable of rotating roller assembly 400 about hub 450. The roller assembly 400 rotates about hub 450.

Figure 4B:
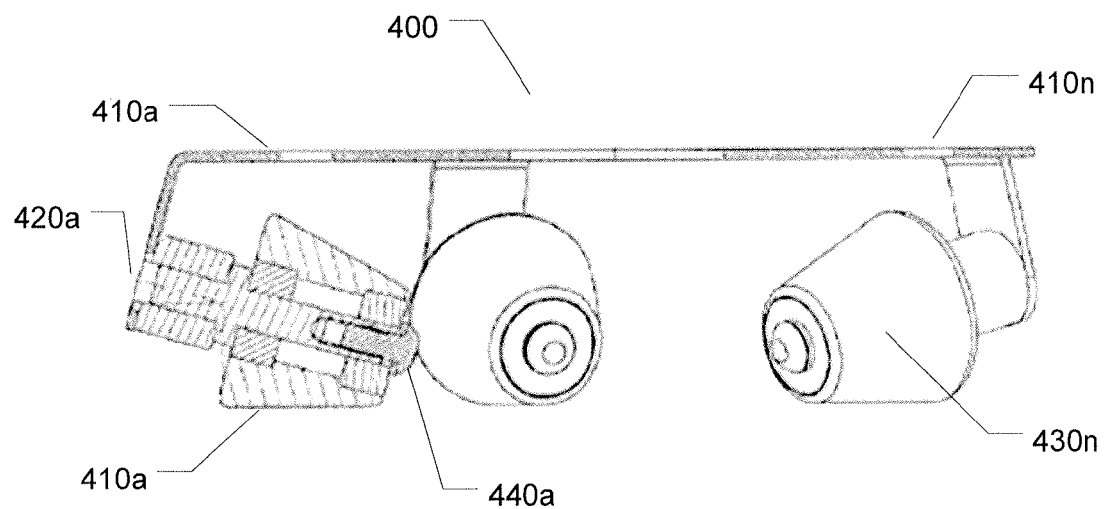
FIG. 4b is a side cut away view of the roller assembly of FIG. 4a according to the principles of the present invention.

FIG. 4b is a side cut away view of the roller assembly of FIG. 4a according to the principles of the present invention. In FIG. 4b, the interior of roller 410 is depicted. Roller 410a-n has hollow bore that receives pin 420a. Pin 420a is also fixed to arm 430. Roller 410 rotates about pin 420a. A cap pin 440a retains roller 410 on pin 420a. Arms 430a-n are bent at an angle of greater than 90 degrees so that the bottom surface of roller 410a-n (the surface of roller 410a-n that contacts the elastomeric sheet or tubing) is generally parallel to the portion of arm 430a-n that is coupled to hub 450. Roller 410a-n is generally conical (and more particularly, roller 410a-n is shaped like a portion of a cone). As such, the rolling surfaces of roller 410a-n are not parallel to (or disposed at an angle with respect to) the pin 420a-n and cap pin 440a-n.

Figure 4C:
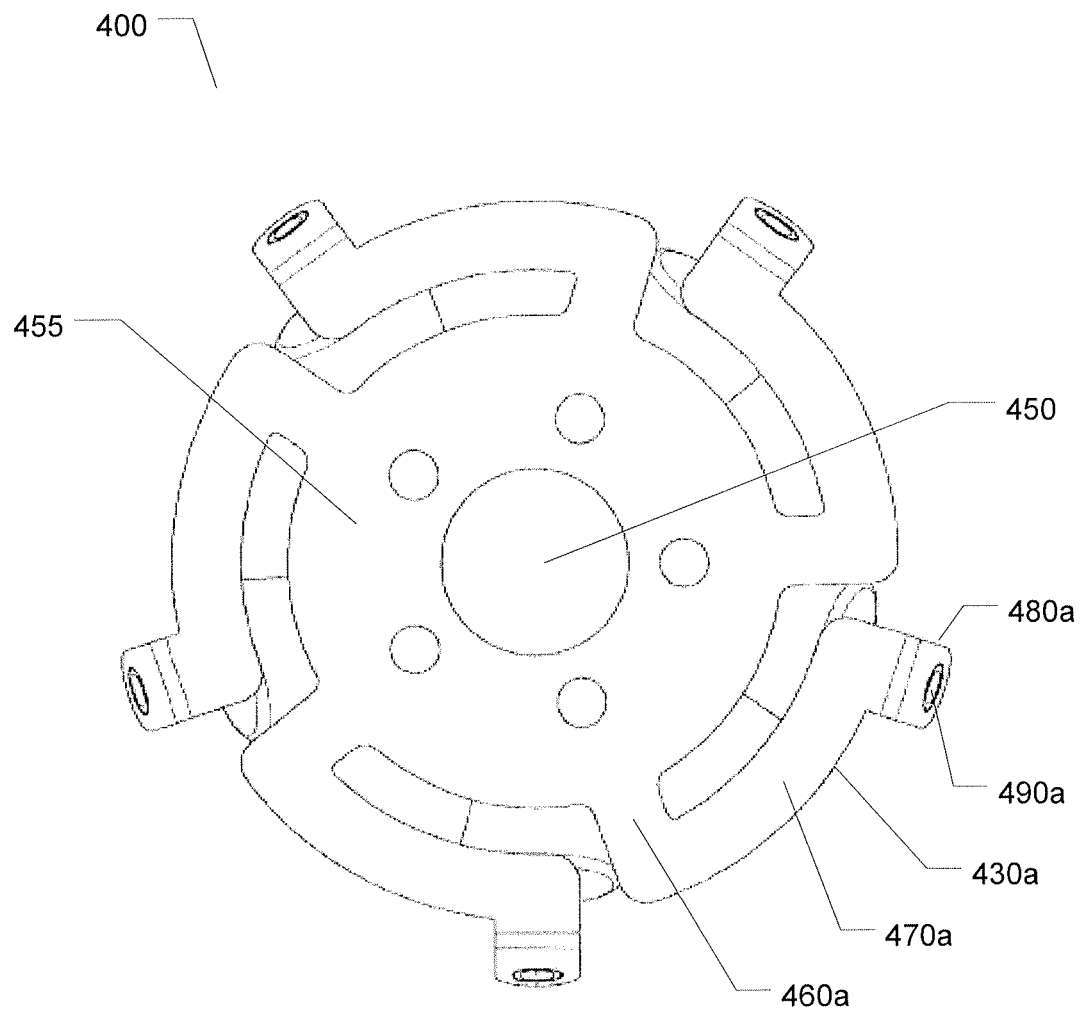
FIG. 4c is a top view of the roller assembly of FIG. 4a according to the principles of the present invention.

FIG. 4c is a top view of the roller assembly of FIG. 4a according to the principles of the present invention. In FIG. 4c, the configuration of arms 430a-n are more clearly shown. As an example, one arm (430a) comprises three sections: a radial section 460a, an arcuate section 470a, and a bent section 480a. Bent section 480a includes a hole 490a for receiving pin 420a. Radial section 460a connects arcuate section 470a with central section 455. The top surfaces of arcuate section 470a, radial section 460a, and central section 455 are all generally parallel. Arcuate section 470a connects radial section 460a with bent section 480a. Bent section 480a is bent at an angle with respect to arcuate section 470a. In this example, the angle is greater than 90 degrees so that the rolling surface of roller 410a is generally parallel with the surface of arcuate section 470a (as shown in FIG. 4b for roller 410a). A hole 490a in bent section 480a receives a pin that secures roller 410a.

Central section 455, radial section 460, arcuate section 470 and bent section 480 may all be stamped or formed from a single sheet of material. In such a case, arcuate section 470 is capable of flexing up and down with respect to central section 455. Accordingly, arcuate section 470 has a spring constant associated with it. When the roller assembly 400 is engaged with a flexible tubing or cassette, the arcuate section 470 presses the roller 410 firmly against the flexible tubing or cassette. The spring constant associated with arcuate section 470 may be designed such that a desired force is applied by roller 410 on the flexible tubing or cassette. For example, when the arcuate section 470 is formed from a sheet of steel, a thin sheet may be used to provide a small spring constant or a thicker sheet may be used to provide a greater spring constant. In addition, the force applied by arcuate section 470 on roller 410 keeps roller 410 engaged with the flexible tubing or cassette (for example, when the flexible tubing or cassette is uneven due to fluid and material in it).

Figure 5A:
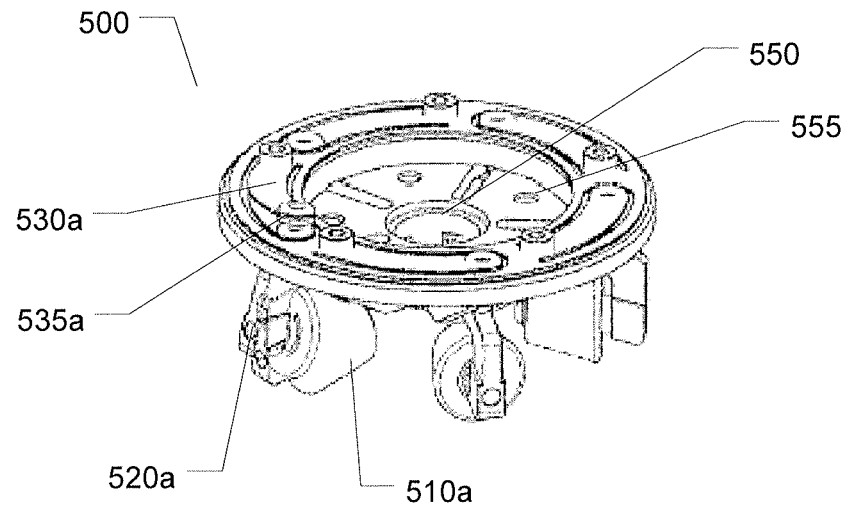
FIG. 5a is an isometric view of a roller assembly according to the principles of the present invention.
Figure 5B:
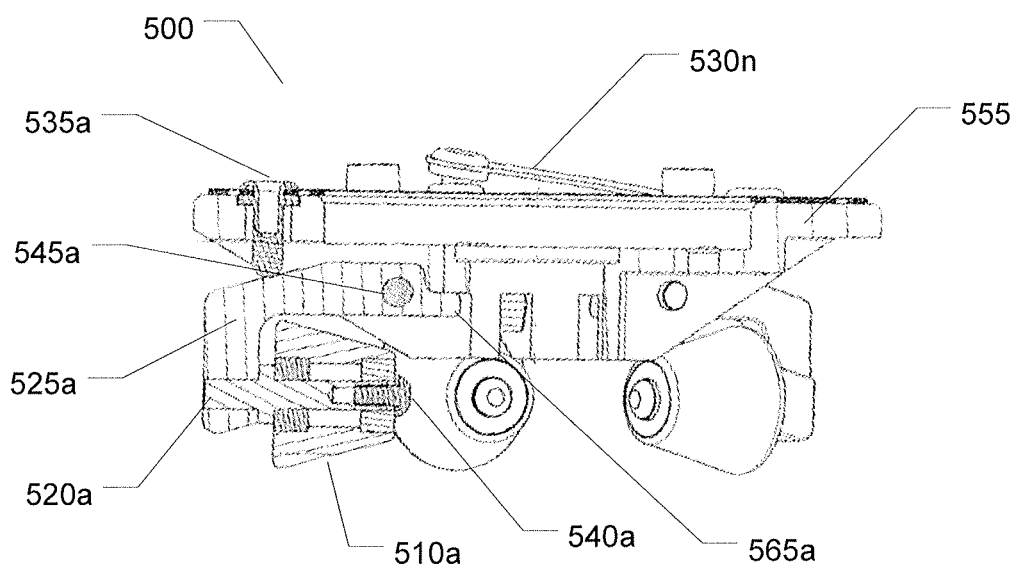
FIG. 5b is a side cut away view of the roller assembly of FIG. 5a according to the principles of the present invention.

FIG. 5a is an isometric view of a roller assembly according to the principles of the present invention. FIG. 5b is a side cut away view of the roller assembly of FIG. 5a according to the principles of the present invention. The structure and operation of the roller assembly of FIGS. 5a-5b is similar to that of FIGS. 4a-c. In the roller assembly 500 of FIGS. 5a-5b, rollers 510a-n are rotatably connected to arms 525a-n via pins 520a-n. Accordingly, rollers 510a-n are capable of rotating about pins 520a-n. Arms 525a-n are coupled to central section 555 via pivot 545a-n. Hub 550 is located in central section 555 and forms a center of rotation. In addition, hub 550 provides an opening for connection of the roller assembly 500 to a motor or other device capable of rotating roller assembly 500 about hub 550. The roller assembly 500 rotates about hub 550. The structure and configuration of rollers 510a-n is the same as that of rollers 410a-n.

As more clearly seen in FIG. 5b, arm 525n pivots about pivot 545n. Spring pin 535n is coupled to flexible arm 530n. Flexible arm 530n exerts a force on arm 525n via spring pin 535n. Stop 565n is located at one end of arm 525n and rests against a portion of central section 555. The force exerted by flexible arm 530n holds stop 565n against central section 555, and thus keeps arm 525n in a first, unpivoted position. As roller 510n is engaged with a polymer sheet or tubing, arms 525n can pivot upwards by deflecting flexible arm 530n. In this manner, as a force is applied to roller 510n, arm 525n pivots about pivot 545n. As arm 525n pivots, it pushes on spring pin 535n and deflects flexible arm 530n. Flexible arm 530n may be designed to provide a suitable force against arm 525n via spring pin 535n. As such, flexible arm 530n may have a spring constant sufficient to keep roller 510n pressed securely against a polymer sheet or flexible tubing.

Figure 6A:
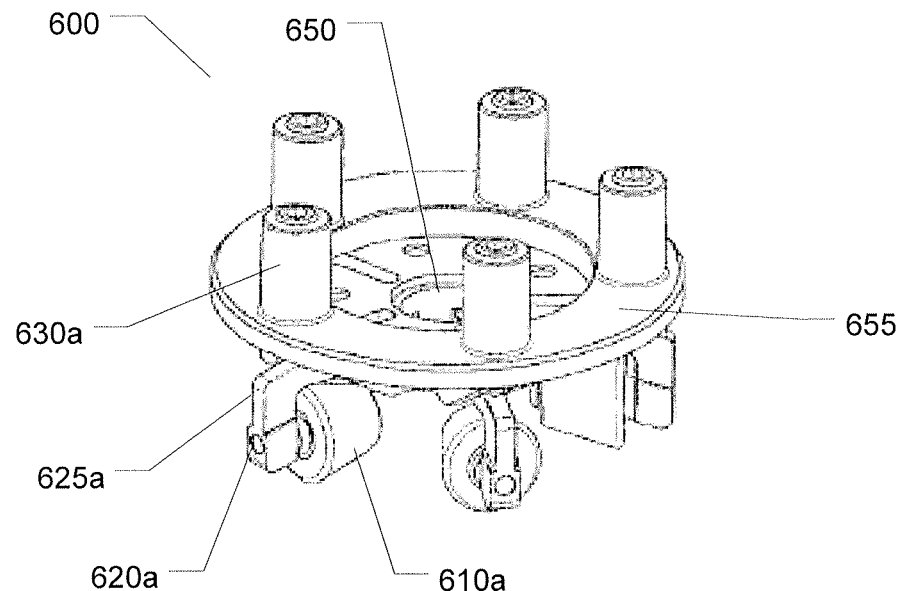
FIG. 6a is an isometric view of a roller assembly according to the principles of the present invention.
Figure 6B:
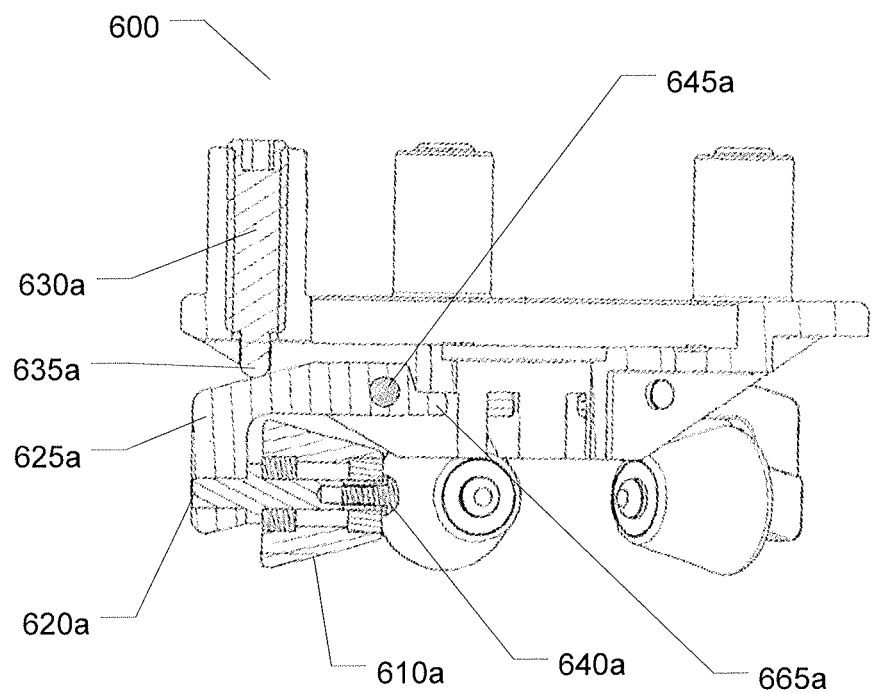
FIG. 6b is a side cut away view of the roller assembly of FIG. 6a according to the principles of the present invention.

FIG. 6a is an isometric view of a roller assembly according to the principles of the present invention. FIG. 6b is a side cut away view of the roller assembly of FIG. 6a according to the principles of the present invention. The structure and operation of the roller assembly of FIGS. 6a-6b is similar to that of FIGS. 4a-4c and 5a-5b. In the roller assembly 600 of FIGS. 6a-6b, rollers 610a-n are rotatably connected to arms 625a-n via pins 620a-n. Accordingly, rollers 610a-n are capable of rotating about pins 620a-n. Arms 625a-n are coupled to central section 655 via pivot 645a-n. Hub 650 is located in central section 655 and forms a center of rotation. In addition, hub 650 provides an opening for connection of the roller assembly 600 to a motor or other device capable of rotating roller assembly 600 about hub 650. The roller assembly 600 rotates about hub 650. The structure and configuration of rollers 610a-n is the same as that of rollers 410a-n.

As more clearly seen in FIG. 6b, arm 625n pivots about pivot 645n. Spring assembly 635n exerts a force on arm 625n. Stop 665n is located at one end of arm 625n and rests against a portion of central section 655. The force exerted by spring assembly 630n holds stop 665n against central section 655, and thus keeps arm 625n in a first, unpivoted position. As roller 610n is engaged with a polymer sheet or tubing, arms 625n can pivot upwards by deflecting spring assembly 630n. In this manner, as a force is applied to roller 610n, arm 625n pivots about pivot 645n. As arm 625n pivots, it pushes on spring assembly 630n. Spring assembly 630n may be designed to provide a suitable force against arm 625n. As such, spring assembly 630n may have a spring constant sufficient to keep roller 610n pressed securely against a polymer sheet or flexible tubing.

Figure 7A:
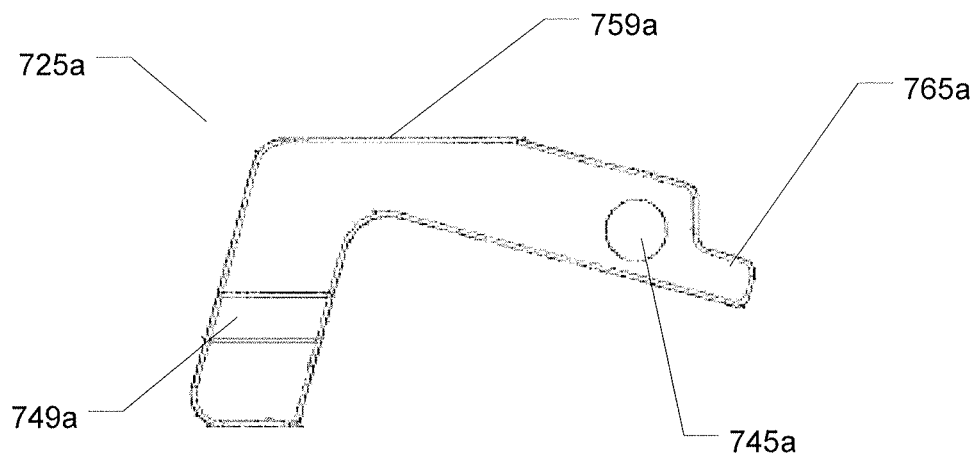
FIG. 7a is a side view of an arm of the roller assembly of FIG. 6a according to the principles of the present invention.
Figure 7B:
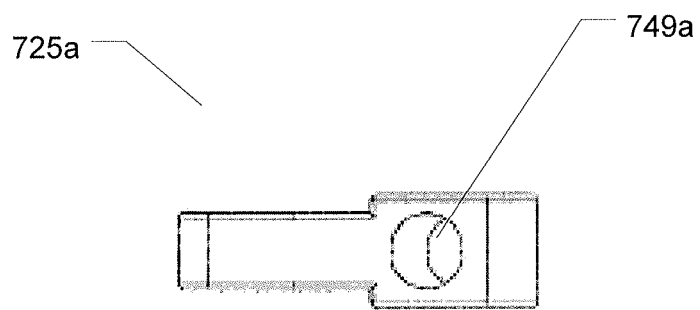
FIG. 7b is an end view of an arm of the roller assembly of FIG. 6a according to the principles of the present invention.

FIG. 7a is a side view of an arm of the roller assembly of FIGS. 5a-5b and 6a-6b according to the principles of the present invention. FIG. 7b is an end view of an arm of the roller assembly of FIGS. 5a-5b and 6a-6b according to the principles of the present invention. Arm 725 has a hole 749n that accepts a pin to engage a roller. A pivot hole 745 accepts a pin that allows arm 725 to pivot about pivot hole 745. A stop 765 is located on one end of arm 725. A flat 759 is located on a top end of arm 725. Flat 759 provides a surface for engagement with a spring pin (as in FIG. 5a-5b) or spring assembly (as in FIGS. 6a-6b). FIG. 7b more clearly shows the hole 749 that accepts a pin to engage a roller.

Figure 8A:
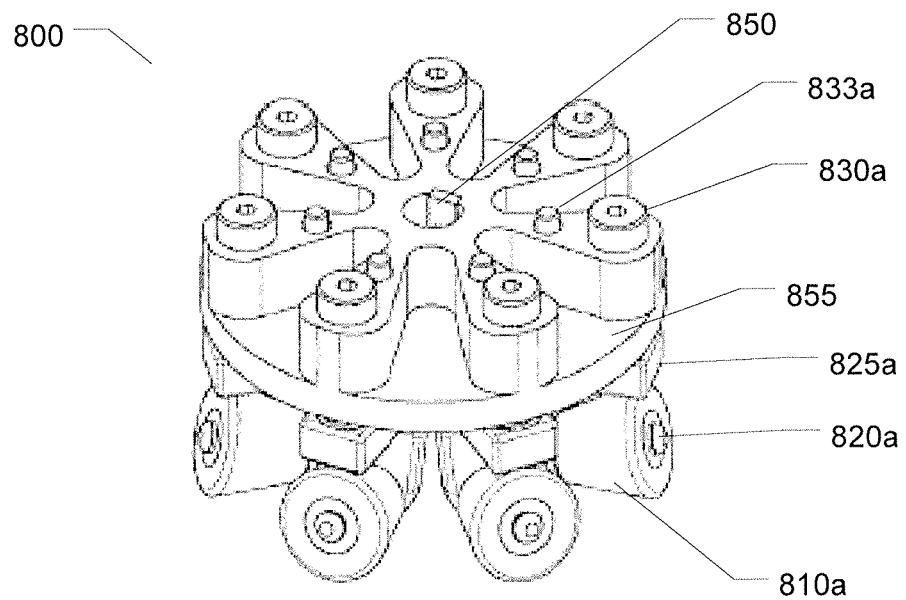
FIG. 8a is an isometric view of a roller assembly according to the principles of the present invention.
Figure 8B:
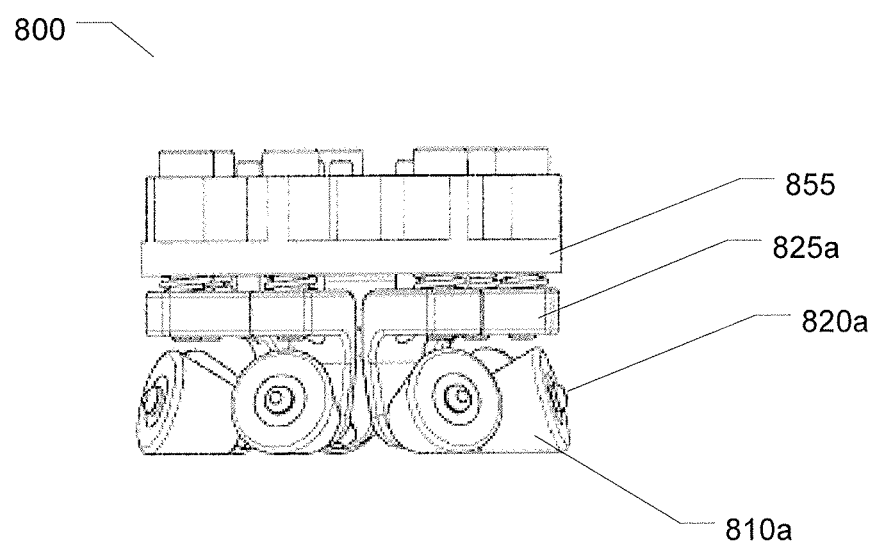
FIG. 8b is a side view of the roller assembly of FIG. 8a according to the principles of the present invention.

FIGS. 8a, 8b, and 8c are an isometric view, a side view, and a side cut away view (respectively) of a roller assembly according to the principles of the present invention. Roller assembly 800 has a central section 855 with a hub 850, rollers 810a-n, pins 820a-n, arms 825a-n, spring pins 830a-n, retaining pins 833a-n, springs 837a-n, and axles 823a-n. Hub 850 is centrally located in central section 855. Roller assembly 800 rotates around hub 850. Rollers 810a-n are coupled to arms 825a-n by pins 820a-n. Each arm 825a-n is coupled to a spring pin 830a-n and a retaining pin 833a-n. One end of spring pin 830a-n is secured to arm 825a-n and the other end of spring pin 830a-n terminates in a cap that rests on top of central section 855. Spring pin 830a-n is located in and can move up and down in a bore in central section 855. Similarly, one end of retaining pin 833a-n is secured to arm 825a-n and the other end of retaining pin 833-n terminates on top of central section 855. Retaining pin 833a-n is located in and can move up and down in a bore in central section 855. Movement of arm 825a-n is constrained by retaining pin 833a-n. Arm 825a-n can only move up and down along retaining pin 833a-n. A spring 837a-n is located between arm 825a-n and central section 855. One end of spring 837a-n is contained in a bore in central section 855, and the other end of spring 837a-n is contained in a bore in arm 825a-n. In this manner, spring 837a-n exerts a force that separates central section 855 from arm 825a-n.

Roller 810a-n is arranged such that the surface of roller 810a-n that contacts a polymer sheet or tubing is generally parallel to a surface of central section 855. In this manner, substantially all of the roller surface of roller 810a-n makes contact with the polymer sheet or tubing as the roller 810a-n moves. Because of retaining pin 833a-n, roller 810a-n moves only up and down with respect to central section 855. As roller 810a-n moves up and down, retaining pin 833a-n slides in a bore in central section 855. Spring 837a-n presses down on arm 825a-n (and attached roller 810a-n). As such, spring 837a-n biases arm 825a-n away from central section 855. The structure and configuration of rollers 810a-n is the same as that of rollers 410a-n.

FIG. 9 is a side cut away view of a single roller head and arm assembly of the roller assembly of FIG. 8a according to the principles of the present invention. In FIG. 9, retaining arm 833a-n is secured to arm 825a-n. An axle 823a-n is also secured to arm 825a-n. Roller 810a-n is secured to axle 823a-n by pin 820a-n and rotates about axle 823a-n. The location of spring 837a-n is also show with respect to arm 825a-n. A recess 843a-n receives spring pin 830a-n.

FIG. 10 is a side view of an arm of the roller assembly of FIG. 8a according to the principles of the present invention. In FIG. 10, arm 825a-n has a hole 842a-n for receiving axle 823a-n, a hole 844a-n for receiving retaining pin 833a-n, and a recess 843a-n for receiving spring pin 833a-n.

Figure 11A:
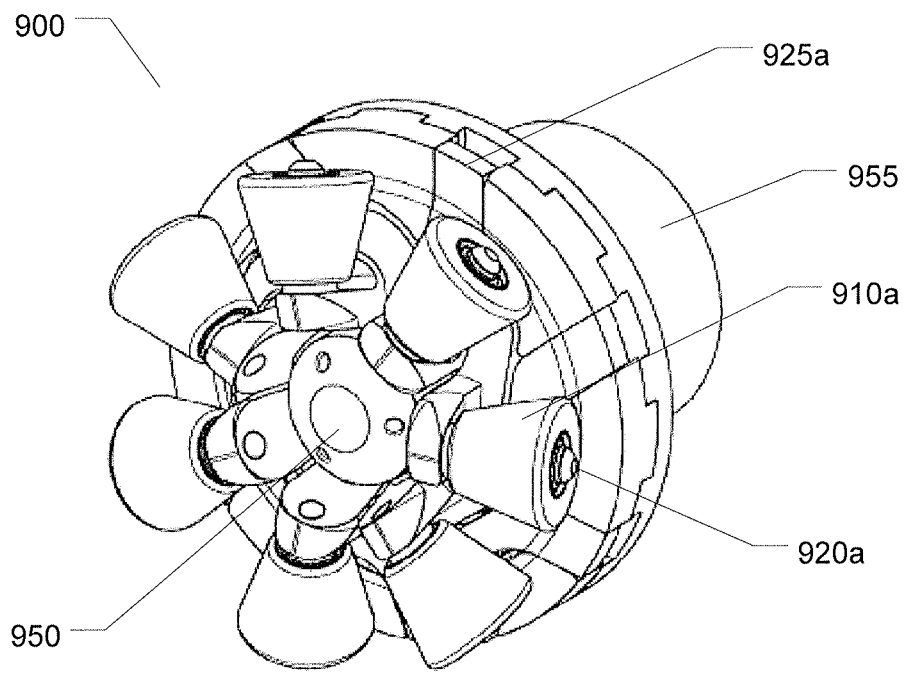
FIG. 11a is an isometric view of a roller assembly according to the principles of the present invention.

FIGS. 11a-11d are various isometric views of a roller assembly according to the principles of the present invention. In FIG. 11a-11d, roller assembly 900 has a central section 955. A hub 950, rollers 910a-n, pins 920a-n, arms 925a-n, pivots 930a-n, axles 923a-n, springs 937a-n, pivot pins 942a-n and 944a-n, roller arm ends 926a-n, hub bore 957, and spring bores 956a-n. In FIG. 11a, rollers 910a-n are held to arms 925a-n by pins 920a-n. Arms 825a-n are coupled to central section 955 such that arms 925a-n can pivot with respect to central section 955. A hub 950 is located at the center of central section 955. Roller assembly 900 rotates about hub 950. Rollers 910a-n are oriented such that the rolling surface of rollers 910a-n contact a polymer sheet or flexible tubing during a peristaltic pumping process.

Figure 11B:
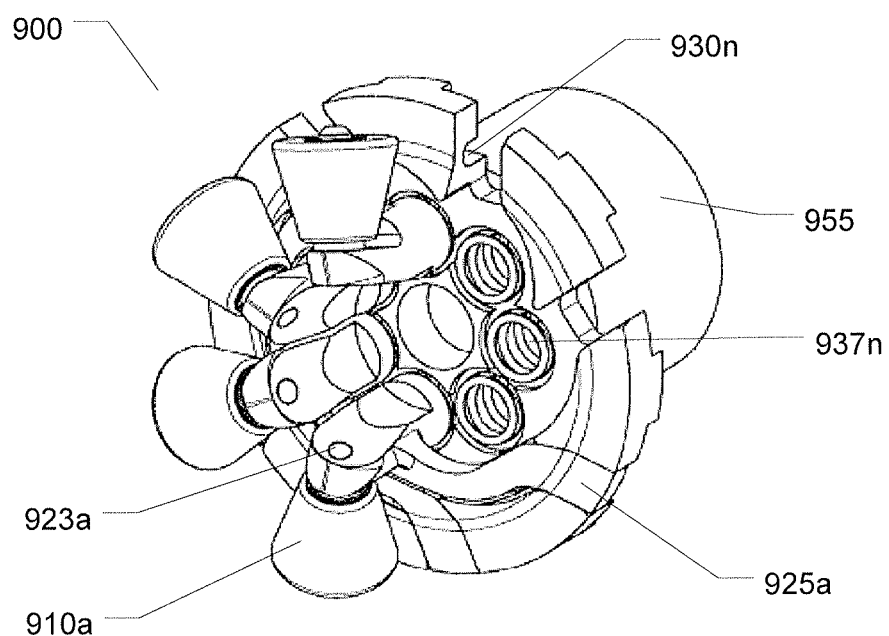
FIG. 11b is a partial isometric view of the roller assembly of FIG. 11a according to the principles of the present invention.

As more clearly shown in FIG. 11b, rollers 910a-n are connected to arms 925a-n via axles 923a-n and pins 920a-n. Springs 937a-n are located in central section 955 beneath rollers 910a-n (more particularly beneath arms 925a-n that couple to rollers 910a-n). Pivots 930a-n provide an attachment location for arms 925a-n. Arms 925a-n are attached to central section 955 at pivots 930a-n. Arms 925a-n pivot with respect to central section 955 at pivots 930a-n. The structure and configuration of rollers 910a-n is the same as that of rollers 410a-n.

Figure 11C:
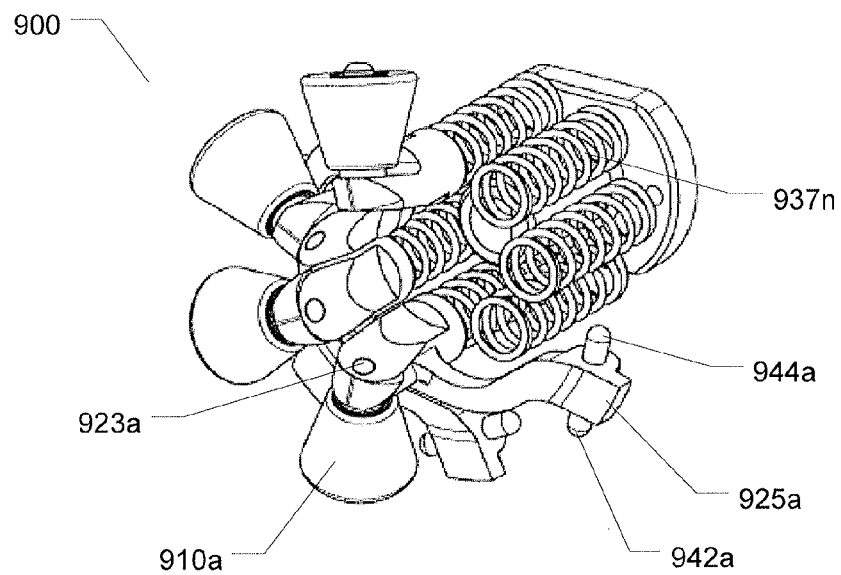
FIG. 11c is a partial isometric view of the roller assembly of FIG. 11a according to the principles of the present invention.

FIG. 11c more clearly shows the structure of arms 925a-n and the location of springs 937a-n. In FIG. 11c, arms 925a-n each have two pivot pins 942a-n and 944a-n. The pivot pins, 942a-n and 944a-n, fit into pivots 930a-n of central section 955. In this manner, the pivot pins, 942a-n and 944a-n, each fit into the recesses that define the pivots 930a-n in central section 955. Pivot pins, 942a-n and 944a-n, couple arms 910a-n to central section 955. Springs 937a-n are located beneath arms 925a-n and provide a spring force that biases arms 925a-n upward. Hub 950 engages a hub engaging surface 968a-n (in FIG. 12a) that retains arms 925a-n.

Figure 11D:
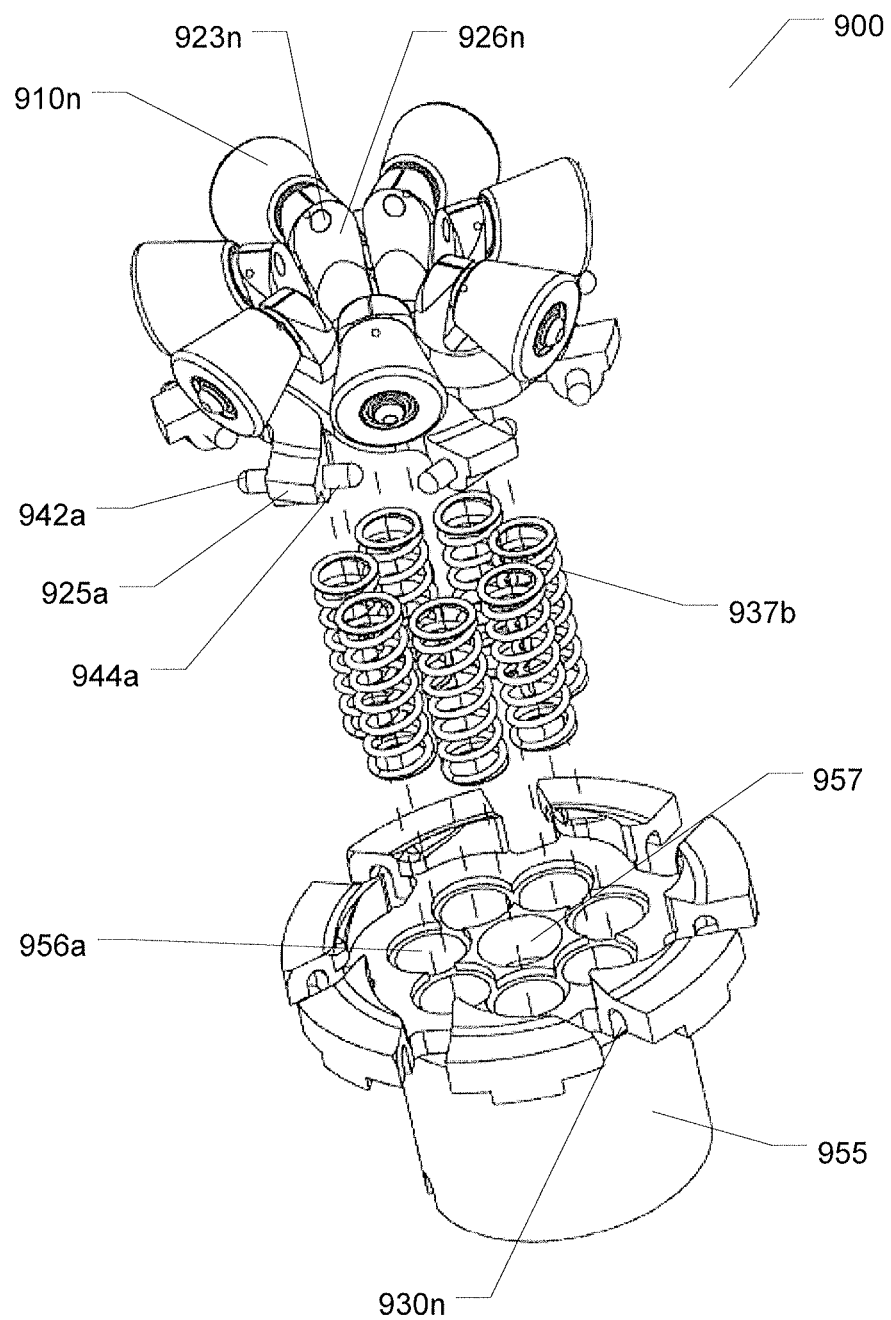
FIG. 11d is an expanded isometric view of the roller assembly of FIG. 11a according to the principles of the present invention.

FIG. 11d shows how the arms 925a-n, springs 937a-n, and central section 955 fit together. Central section 955 has a hub bore 957 that receives hub 950, and spring bores 956a-n that receive springs 937a-n. In addition, central section 955 also has a pair of pivots 930a-n for each arm 925a-n. Each arm 925a-n has a spring 937 associated with it. Springs 937a-n fit into spring bores 956a-n. Springs 937a-n are retained in spring bores 956a-n by a back surface of central section 955 (shown in FIG. 11c) and hub 950 (which presses arms 925a-n against springs 937a-n and serves to retain arms 937a-n). Pivot pins 942a-n and 944a-n fit into pivots 930a-n in central section 955.

Figure 12A:
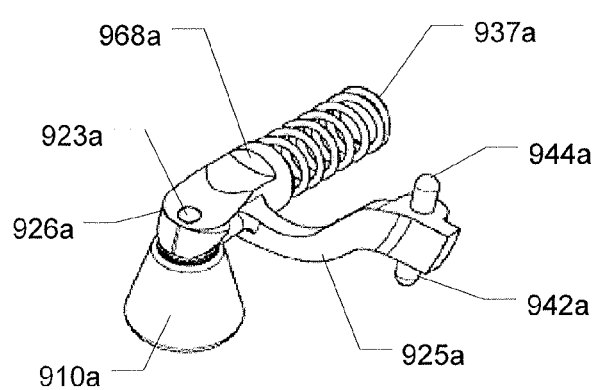
FIG. 12a is an isometric view of an arm of the roller assembly of FIG. 11a according to the principles of the present invention.
Figure 12B:
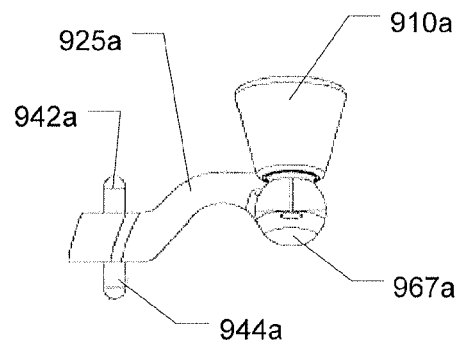
FIG. 12b is an isometric view of an arm of the roller assembly of FIG. 11a according to the principles of the present invention.
Figure 12C:
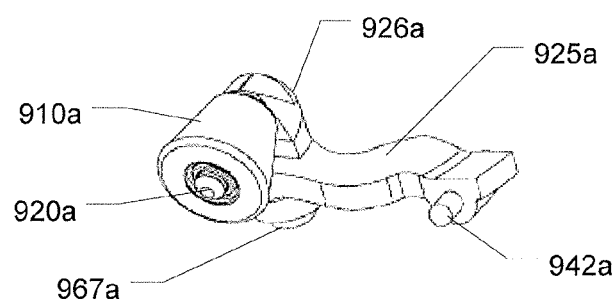
FIG. 12c is an isometric view of an arm of the roller assembly of FIG. 11a according to the principles of the present invention.

FIGS. 12a-12c are various isometric views of an arm of the roller assembly of FIGS. 11a-11d according to the principles of the present invention. Arms 925a-n have a pair of pivot pins 942a-n and 944a-n, a spring coupling surface 967a-n, a hub retaining surface 968a-n, and a roller arm end 926a-n. Rollers 910a-n are coupled to arms 925a-n at the roller end 926a-n. Axles 923a-n are fixed to roller arms end 926a-n. Rollers 910a-n are held on axles 923a-n by pins 920a-n. Each arm 925a-n has a pivot end that couples the arm to the central section 955. Arm 925a-n has a generally curved or arcuate profile such that the roller end 926a-n and pivot end (end on which pivots 942a-n and 944a-n reside) are arranged to couple the arm 925a-n to the central section 955 and to allow for proper alignment of roller 910a-n. Generally, the pivot end of arm 925a-n is at least one roller width distance from the roller end 926a-n of arm 925a-n. In addition, the roller end 926a-n of the arm 925a-n is located a distance away in two different directions from the pivot end of the arm 925a-n. In this manner, arm 925a-n is curved with respect to two different planes. With the pivot end fixed to a periphery of the central section 955, the roller end 926a-n of arm 925a-n is located interior to the periphery of central section 955 and above central section 955.

Each arm 925a-n has a spring coupling surface 967a-n associated with it. The spring coupling surface 967a-n rests against spring 937a-n. Spring coupling surface 967a-n has a lip that receives an end of spring 937a-n. Arms 925a-n is configured such that a surface of roller 910a-n contacts a polymer sheet or flexible tubing during the entire travel of arm 925a-n (as arm 925a-n pivots with respect to central section 955). Springs 937a-n bias arms 925a-n away from central section 955. As rollers 910a-n encounter variations in a polymer sheet or flexible tubing, rollers 925a-n are pressed towards central section 955 thus compressing spring 937a-n. In this manner, rollers 910a-n are held tightly against a polymer sheet or flexible tubing by springs 937a-n. Because of the shape of arms 925a-n and the distance between the rollers 910a-n and the pivots 930a-n, rollers 910a-n are held against a polymer sheet or flexible tubing such that a surface of rollers 910a-n press firmly against the polymer sheet or flexible tubing. The rolling surface of rollers 910a-n remains general parallel to the polymer sheet or flexible tubing throughout travel of the arms 925a-n.

Regardless of the embodiment described above, the rollers are biased against a polymer sheet or flexible tube such that the rolling surface of the rollers presses against the polymer sheet or flexible tube. The rolling surface of the rollers (i.e. the surface that contacts the polymer sheet or flexible tube) is generally parallel to the polymer sheet or flexible tube so as to press against it. The rollers are maintained against the polymer sheet or flexible tube by a spring force so as to provide peristaltic pumping as the roller assembly rotates.

From the above, it may be appreciated that the present invention provides an improved peristaltic pump system. The present invention provides independent roller heads for use with a peristaltic pump system. The present invention is illustrated herein by example, and various modifications may be made by a person of ordinary skill in the art.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A roller assembly comprising:
a circular central section with a hub, the roller assembly rotating about the hub on a rotation axis of the hub;
a plurality of curved flexible arms coupled to the central section, each of the plurality of curved flexible arms located circumferentially around a periphery of the central section and generally co-planar with the central section in a plane perpendicular to the rotation axis of the hub;
a plurality of spring pins, one spring pin coupled to each of the plurality of flexible arms;
a plurality of arms coupled to the central section such that each arm is capable of pivoting independently with respect to the central section; and
a plurality of rollers, one roller coupled to each of the plurality of arms, each roller rotating about a roller rotation axis;
wherein each of the plurality of flexible arms biases one of the plurality of arms away from the central section in a direction generally parallel to the rotation axis of the hub, and the roller rotation axis of each roller is perpendicular to the rotation axis of the hub.

2. The roller assembly of claim 1 wherein each of the rollers is coupled to a respective one of the plurality of arms with a pin.

3. The roller assembly of claim 1 wherein the arms and the rollers are distributed around the hub.

4. The roller assembly of claim 1 wherein a rolling surface of the rollers is generally parallel with a flat surface of the central section.

5. The roller assembly of claim 1 wherein the arm has a stop located at an end of the arm, the stop engages the central section to limit a range of pivoting motion of the arm.

6. The roller assembly of claim 5 wherein the arm is coupled to a pivot, the pivot located adjacent to the stop.

7. The roller assembly of claim 1 wherein each of the plurality of arms has a flat that contacts an associated one of the plurality of spring pins.

8. The roller assembly of claim 7 wherein each of the spring pins exerts a force on an associated one of the flats, the force provided by a respective one of the flexible arms.

9. The roller assembly of claim 7 wherein each of the spring pins presses on an associated one of the flats to bias the respective one of the plurality of arms in an unpivoted position whereby a stop located on each of the plurality of arms contacts the central section.

10. The roller assembly of claim 1 wherein the plurality of flexible arms and a top surface of the central section are formed from a single sheet of material.

11. The roller assembly of claim 4 wherein the rolling surface of the rollers is arranged to engage a polymer sheet or flexible tubing throughout a range of travel of the arms.

12. A roller assembly comprising:
a circular central section with a hub, the roller assembly rotating about the hub on a rotation axis of the hub;
a plurality of curved flexible arms coupled to the central section, each of the plurality of curved flexible arms located circumferentially around a periphery of the circular central section and generally co-planar with the central section in a plane perpendicular to the rotation axis of the hub;
a plurality of spring pins, one spring pin coupled to each of the plurality of flexible arms;
a plurality of arms coupled to the central section such that each arm is capable of pivoting independently with respect to the central section, each arm having a pivot located adjacent to a stop; and
a plurality of rollers, one roller coupled to each of the plurality of arms, each roller rotating about a roller rotation axis;
wherein each spring pin exerts a force on an associated arm, the force provided by an associated flexible arm so as to bias the arm in a nonpivoted position away from the central section in a direction generally parallel to the rotation axis of the hub; and wherein the roller rotation axis of each roller is perpendicular to the rotation axis of the hub.

13. The roller assembly of claim 12 wherein each of the rollers is coupled to a respective one of the plurality of arms with a pin.

14. The roller assembly of claim 12 wherein the arms and the rollers are distributed around the hub.

15. The roller assembly of claim 12 wherein a rolling surface of the rollers is generally parallel with a flat surface of the central section.

16. The roller assembly of claim 15 wherein the rolling surface of the rollers is arranged to engage a polymer sheet or flexible tubing throughout a range of travel of the arms.

* * * * *